United States Patent [19]

Sidles

[11] 3,961,428
[45] June 8, 1976

[54] MUD RESISTANCE ELASTOMER
[75] Inventor: James Sidles, Richfield, Ohio
[73] Assignee: The B. F. Goodrich Company, Akron, Ohio
[22] Filed: Feb. 19, 1975
[21] Appl. No.: 550,976

Related U.S. Application Data
[62] Division of Ser. No. 173,883, Aug. 23, 1971, abandoned.

[52] U.S. Cl. .............................. 36/32 R; 36/59 C; 36/116
[51] Int. Cl.² .................. A43B 13/04; A43B 23/28
[58] Field of Search ........... 36/32 R, 2.5 R, 2.5 AA, 36/2.5 AB, 59 R, 59 C, 4, 7.3

[56] References Cited
UNITED STATES PATENTS
2,710,461  6/1955  Hack .................................. 36/59 C
2,930,149  3/1960  Hack et al. ......................... 36/59 C
3,507,059  4/1970  Vietas ................................ 36/59 C Primary Examiner—Patrick D. Lawson
Attorney, Agent, or Firm—J. Januszkiewicz; W. A. Shira, Jr.

[57] ABSTRACT

A sole and heel construction such as used on overshoes, boots or shoes having a resilient planar body with a plurality of spaced thin fins that extend transversely across the body. The fins are evenly spaced and uniform in width throughout. All fins are identical and are inclined relative to a horizontal plane such that any weight applied to the sole compresses the fins to trap air between adjacent fins to minimize mud build-up.

6 Claims, 2 Drawing Figures

MUD RESISTANCE ELASTOMER

CROSS-REFERENCE TO RELATED APPLICATION

This application is a division of patent application Ser. No. 173,883 filed Aug. 23, 1971 abandoned.

BACKGROUND OF THE INVENTION

This invention relates to a molded, resilient self-cleaning piece of rubber and more particularly to a new and improved molded rubber sole which has a novel action of trapping air to clean itself when used in the environment of mud.

It has been known to construct shoe soles and heels of resilient deformable materials such as rubber, flexible plastics and other suitable compositions which have a plurality of transversely arranged corrugated ribs, undulations which project downwardly from and formed integrally with an upper section that is secured to the base portion of a shoe. The ribs generally project rearwardly from the front or toe section of the shoe towards the rear or heel portion and are inclined downwardly when viewed in side elevation on a shoe. Such ribs in shoe construction have been confined to the general use of facilitating the walking action or to ease the wearer's comfort in standing. The variations in construction of such deformable ribs has been claimed to increase resiliency and the forward gliding action imparted to the wearer's feet during walking or running.

The sole construction of the present invention which is particularly adaptable to overshoes is a completely new concept over such corrugated ribs by providing a plurality of transversely extending flexible fins that are thinner in construction and even in spacing and of such length that they trap air between adjacent fins upon deflection such that they spring back into original shape and will clean themselves if such fins come in contact with mud. One form of the invention is to have a plurality of fins disposed at approximately 45° angle with respect to the horizontal plane and with the spaces between the fins being of a width that is equal to the width or thickness of the fins, and the height of the fins being equal to the depth of the space that is defined by pairs of adjacent fins. The fins are flexible such that the normal walking action of the overshoe will compress the fins in the sole to effect a trapping action of the air to clean the mud that is encountered on the lower most surface. The construction of the ground contacting element of a shoe or boot may be such as to have the angular disposition of the heel and toe portions at different angles relative to each other.

SUMMARY OF THE INVENTION

This invention relates to sole construction such as used on overshoes, boots, or shoes wherein the sole has a resilient body that is adapted to be fixedly secured to the base of the shoe or an integral part of it as constructed. The sole has a plurality of transversely extending fins, which fins slant downwardly from the resilient body. Each fin's front and rear slanting surfaces are parallel with all fins being of uniform thickness throughout. The groove between adjacent fins are equal in width and depth, cooperating with the fins on their deflection to trap air to facilitate the self-cleaning feature such that the sole of overshoes clean the mud therefrom. This invention is applicable to other uses that remove mud from their operating surfaces as in mud from tire surfaces.

DETAILED DESCRIPTION

Figure 1:
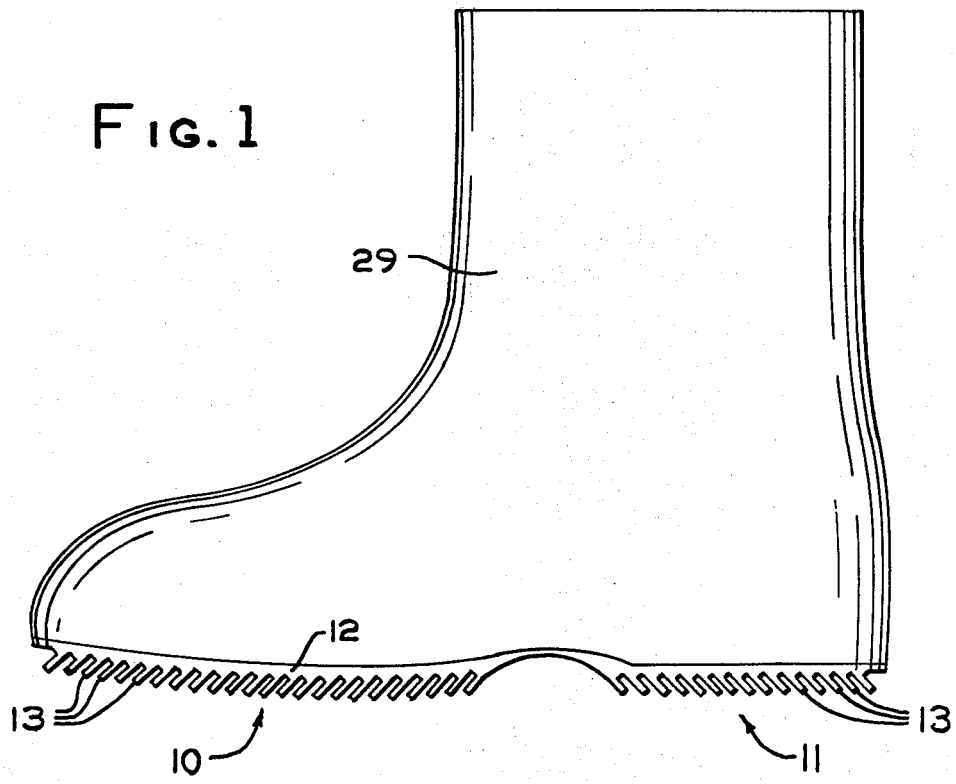
FIG. 1 is side elevational view of a boot showing a sole and heel construction.

Referring to the drawings wherein like reference characters design to like or corresponding parts throughout the several views, there is shown in FIG. 1 a boot having a sole and heel construction made in accordance with the present invention. It is to be understood that this sole construction is particularly adaptable to an overshoe or boot construction which encounters mud. The term "sole" as hereinafter used unless otherwise designated covers the entire undersurface of the shoe 11 and includes the heel and toe portion. The sole's forward portion would be the toe portion 10 and the sole's rearward portion would be considered the heel portion 11. The sole includes a solid planar portion 12 that is generally horizontally disposed. The heel portion of the sole's boot has a plurality of downward and rearwardly extending fins 13. The fins 13 extend transversely across the heel 11 defining grooves 14 between adjacent pairs of fins 13. Each fin 13 is of the same uniform thickness "a" throughout its height designated "b" in FIG. 2. The fins extend downwardly and rearwardly from the planar portion 12, with each fin having a front surface portion 15 and a rear surface portion 16. All the front and rear surfaces 15 and 16 of the fins 13 are parallel and disposed at approximately 45° with respect to the horizontal. When considering the height of the fins, the measurement along the front surface may be designated "b" (FIG. 2) whereas the measurement along the rear surface may be designated "c". For simplicity of understanding the height will be understood to be represented by measurement "c". The depth of the grooves 14 may also be designated "c", which dimension is the same as the height of the fins 13. The length of the fins 13 and the grooves 14 are determined by the width of the sole if viewed in plane. The base 17 of the respective fins 13 cooperate with the grooves 14 to trap air to facilitate the self-cleaning action of the sole.

The toe portion 10 has the fins 13 identical in shape and size to the fins 13 of the heel portion described above; however, the fins slant downwardly and forwardly.

Figure 2:
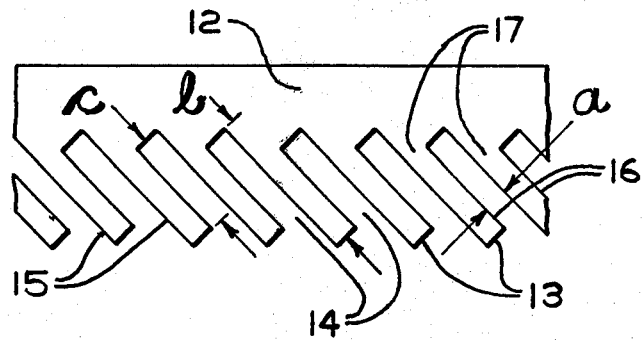
FIG. 2 is an enlarged fragmentary side elevational view of a portion of the fin construction of FIG. 1, wherein the construction is shown five times its normal size.

The operation of the sole in the environment of mud, as where an individual uses an overshoe with the sole constructed in accordance with the above described structure, is such that in walking the fins 13 yield as they are pressed into the mud, trapping air at the base of the fins. As the sole is raised out of the mud surface the air acts to break up the suction that would ordinarily exist. The sides of the fins would open and allow the air to flow into the groove and facilitate the peeling off and breaking off of the mud. The precise action of the fins and phenomenon occuring is not fully understood, however, tests made of such surfaces in use have shown that because of the above described sole construction, boots and overshoes reduce the amount of mud picked up by up to 90% in weight, compared with boots having conventional soles. As an example of the dimension depicted by FIG. 2, dimension "a" which is the width of the groove 14 as well as the thickness of the fin is 0.035 of an inch, while the depth of the groove 14, or height of the fin 13, dimension "c", along its rear surface is 0.15 of an inch, and the height of the fin 13 along its forward face 15 which is dimension "b" is 0.23 of an inch. FIG. 2 illustrates the size of the fins 13 and grooves 14 magnified approximately five times the actual size.

The fin structure in FIG. 1 is larger than actually proportioned; however, such sole construction in FIG. 1 is shown to illustrate the general overall structure in use. The proportions are shown in FIG. 3 wherein the size is magnified five times.

Various modifications are contemplated and may obviously be resorted to by those skilled in the art without departing from the described invention, as hereinafter defined by the appended claims as only a preferred embodiment thereof has been disclosed.

I claim:

1. In a ground contacting element which covers substantially the entire bottom surface of a boot, overshoe, shoe or the like, a resilient body adapted to fixedly be secured to the base of an overshoe, said resilient body having a sole portion and a heel portion, said heel and sole portions having a plurality of transversely extending flexible fins, said heel portion being at the rear of said overshoe and said toe portion being at the forward of said overshoe, said fins on said heel portion comprising a first group extending downwardly and rearwardly from said resilient body, said fins on said sole portion comprising a second group extending downwardly and forwardly from said resilient body, the respective fins of said first group have respective front and rear surface portions that are parallel to each other and parallel to adjacent faces of adjacent fins in said first group, the respective fins of said second group have respective front and rear surface portions that are parallel, all of said fins being longitudinally extending, linearly straight and of uniform width for the entire length and height thereof, and said fins of each group being cooperative with adjacent fins in their said respective groups defining grooves therebetween.

2. In a ground contacting element as set forth in claim 1 wherein each of said grooves are of uniform width for the entire length thereof, and each groove width is equal to the width of said fins.

3. In a ground contacting element as set forth in claim 2 wherein said width of all of said fins is in the range of 0.016 of an inch to a 0.25 of an inch.

4. A ground contacting element for covering substantially the entire bottom surface of a shoe or the like comprising a resilient body adapted to be secured to the base of a shoe, said resilient body having a forward portion and a rearwardly disposed portion, one of said portions having a plurality of straight transversely extending flexible thin fins, said fins of said one portion having front and rear surfaces that are parallel to each other and parallel to adjacent faces of adjacent fins, the other of said portions having a plurality of straight transversely extending flexible thin fins, said fins of said other portion having front and rear surfaces that are parallel to each other, and the extension of planes containing said faces of said fins of said one portion intersect the extension of the planes containing said faces of said fins of said other portion, all of said fins being of substantially uniform thickness throughout the length thereof, and said fins of each separate portion as a group define grooves of equal dimensions within their own group.

5. A ground contacting element as set forth in claim 4 wherein said surfaces of said fins make an angle of 45° with a horizontal plane.

6. A ground contacting element as set forth in claim 5 wherein the ratio of the height of said fin to the thickness of said fin is approximately 4.5 to 1.

* * * * *